(12) United States Patent
Jensen et al.

(10) Patent No.: US 7,641,112 B2
(45) Date of Patent: Jan. 5, 2010

(54) TRANSACTION CARD WITH SEEDS

(75) Inventors: Stacy M. Jensen, Burns Township, MN (US); Paul W. Boge, Mora, MN (US)

(73) Assignee: Target Brands, Inc., Minneapolis, MN (US)

( * ) Notice: Subject to any disclaimer, the term of this patent is extended or adjusted under 35 U.S.C. 154(b) by 10 days.

(21) Appl. No.: 12/233,731

(22) Filed: Sep. 19, 2008

(65) Prior Publication Data

US 2009/0008462 A1     Jan. 8, 2009

Related U.S. Application Data

(63) Continuation of application No. 11/697,276, filed on Apr. 5, 2007, now Pat. No. 7,438,224.

(51) Int. Cl.
*G06K 5/00* (2006.01)
*G06Q 40/00* (2006.01)
*G07D 11/00* (2006.01)
*G07F 19/00* (2006.01)
*G06Q 20/00* (2006.01)
*B42D 15/10* (2006.01)
*A01C 15/00* (2006.01)

(52) U.S. Cl. ............... 235/380; 235/379; 235/487; 235/488; 705/64; 283/72; 111/200

(58) Field of Classification Search ........... 235/379, 235/380, 487, 488; 705/64; 283/72; 111/200
See application file for complete search history.

(56) References Cited

U.S. PATENT DOCUMENTS

| | | | |
|---|---|---|---|
| 2,294,567 A | 9/1942 | Mooney | |
| 2,461,054 A | 2/1949 | Green | |
| 3,098,320 A | 7/1963 | Estkowski | |
| 3,643,795 A | 2/1972 | Watwood et al. | |
| 3,908,308 A | 9/1975 | Meyers | |

(Continued)

FOREIGN PATENT DOCUMENTS

FR     2584983     1/1987

(Continued)

OTHER PUBLICATIONS

Photographs of a gift card product offered for sale in Target stores more than one year prior to Apr. 5, 2007.

(Continued)

*Primary Examiner*—Daniel Walsh
(74) *Attorney, Agent, or Firm*—Griffiths & Seaton PLLC

(57) ABSTRACT

A financial transaction card includes a substantially biodegradable substrate, a plurality of seeds, and an account identifier. The plurality of seeds is coupled with the substantially biodegradable substrate such that the plurality of seeds is embedded within and substantially surrounded by the substantially biodegradable substrate. When the financial transaction card is inserted into a planting composition, the substantially biodegradable substrate decomposes leaving the plurality of seeds planted in the planting composition. The account identifier is securely connected to the substrate and links the substantially biodegradable substrate to a financial account. The account identifier is machine readable by a point-of-sale terminal. Stored-value card assemblies, methods of encouraging purchase and facilitating use of a stored-value card, and other embodiments are also disclosed.

23 Claims, 8 Drawing Sheets

U.S. PATENT DOCUMENTS

| | | | |
|---|---|---|---|
| 4,132,329 | A | 1/1979 | Harrison |
| 4,168,002 | A | 9/1979 | Crosby |
| 4,353,183 | A | 10/1982 | Estkowski |
| 4,418,497 | A | 12/1983 | Mastriano |
| D297,334 | S | 8/1988 | Trent |
| D309,473 | S | 7/1990 | Toy |
| 5,001,860 | A | 3/1991 | Rudnick |
| 5,158,809 | A | 10/1992 | Proctor |
| D332,113 | S | 12/1992 | Yates |
| 5,210,975 | A | 5/1993 | Beckerman |
| 5,323,553 | A | 6/1994 | Candido |
| D370,499 | S | 6/1996 | Bechler et al. |
| 5,570,081 | A | 10/1996 | Holstrom |
| 5,575,384 | A | 11/1996 | Saye |
| 5,720,129 | A | 2/1998 | Lantinberg |
| D394,454 | S | 5/1998 | Williams et al. |
| 5,840,355 | A | 11/1998 | Prescott et al. |
| 6,096,431 | A | 8/2000 | Matsudaira et al. |
| D432,174 | S | 10/2000 | Stevens et al. |
| D432,176 | S | 10/2000 | Stevens et al. |
| 6,269,158 | B1 | 7/2001 | Kim |
| 6,338,211 | B1 | 1/2002 | Carney |
| D453,336 | S | 2/2002 | Pentz et al. |
| D453,338 | S | 2/2002 | Pentz et al. |
| 6,350,530 | B1 | 2/2002 | Morikawa et al. |
| D454,910 | S | 3/2002 | Smith et al. |
| 6,355,285 | B1 | 3/2002 | Hoy |
| 6,372,331 | B1 | 4/2002 | Terada et al. |
| D458,633 | S | 6/2002 | Nada et al. |
| 6,588,658 | B1 | 7/2003 | Blank |
| D481,067 | S | 10/2003 | Haas |
| 6,655,868 | B2 | 12/2003 | Drew |
| 6,684,561 | B2 * | 2/2004 | Poret et al. .................... 47/73 |
| D487,907 | S | 3/2004 | Kumakura |
| D490,103 | S | 5/2004 | Rangel et al. |
| D493,492 | S | 7/2004 | Best et al. |
| D493,840 | S | 8/2004 | Best et al. |
| D501,875 | S | 2/2005 | Dean |
| D504,159 | S | 4/2005 | Best et al. |
| D512,456 | S | 12/2005 | Diaz et al. |
| 7,024,807 | B2 | 4/2006 | Street |
| 7,032,817 | B2 | 4/2006 | Blank |
| 7,065,195 | B1 | 6/2006 | Smith et al. |
| D524,858 | S | 7/2006 | Graves et al. |
| D531,755 | S | 11/2006 | Taylor |
| D533,220 | S | 12/2006 | Graves et al. |
| 7,275,683 | B2 * | 10/2007 | Lazarowicz et al. ......... 235/375 |
| D561,252 | S | 2/2008 | Phillips et al. |
| 7,438,224 | B1 * | 10/2008 | Jensen et al. ................. 235/380 |
| 2002/0000064 | A1 | 1/2002 | D'Agnone et al. |
| 2002/0040670 | A1 * | 4/2002 | Hornak ....................... 111/114 |
| 2002/0143697 | A1 | 10/2002 | Gotfried |
| 2003/0014891 | A1 | 1/2003 | Nelms et al. |
| 2003/0029068 | A1 | 2/2003 | Weber |
| 2004/0246548 | A1 | 12/2004 | Papuchon et al. |
| 2004/0249748 | A1 | 12/2004 | Schultz et al. |
| 2006/0107561 | A1 | 5/2006 | Menzie et al. |
| 2006/0231609 | A1 * | 10/2006 | Lazarowicz et al. ......... 235/380 |
| 2007/0246548 | A1 | 10/2007 | Schultz et al. |
| 2008/0245856 | A1 * | 10/2008 | Jensen et al. ................. 235/380 |
| 2009/0008462 | A1 * | 1/2009 | Jensen et al. ................. 235/494 |

FOREIGN PATENT DOCUMENTS

| | | |
|---|---|---|
| FR | 2707832 | 1/1995 |
| FR | 2795019 | 12/2000 |
| JP | 2227296 | 9/1990 |
| WO | 94/16907 | 8/1994 |

OTHER PUBLICATIONS

"Travel Tags Offers Earth-Friendly Nattera Card," www.traveltags.com, Nov. 21, 2006.

"Ecofit Card," www.dnp.co.jp/international/card/ec.html, printed on Jun. 22, 2006.

"Seeded Paper Card," www.4imprintcom/EXEC/DETAIL/RECOMMENDED/~SKU005244/~CA5244.htm, printed on Jun. 22, 2006.

"Grow-A-Note Greeting Cards," www.greenfieldpaper.com/asc-custompages/products.asp?fpage=1&productID=3&categoryid=3, printed on Jun. 22, 2006.

Original Touch, Sweet Pea, www.originaltouch.co.uk/acatalog/Sweet_Pea.html, available at least as early as Jan. 20, 2008, per the internet archive available at www.archive.org.

* cited by examiner

TRANSACTION CARD WITH SEEDS

CROSS-REFERENCE TO RELATED APPLICATIONS

This application is a continuation of and claims priority under 35 U.S.C. § 120 to U.S. patent application Ser. No. 11/697,276, filed Apr. 5, 2007 and entitled "Transaction Card with Stake," which is incorporated herein by reference.

BACKGROUND OF THE INVENTION

Stored-value cards and financial transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other stored-value cards provide a number of advantages to both the consumer and the retailer.

SUMMARY OF THE INVENTION

One aspect of the present invention relates to a financial transaction card including a substantially biodegradable substrate, a plurality of seeds, and an account identifier. The plurality of seeds is coupled with the substantially biodegradable substrate such that the plurality of seeds is embedded within and substantially surrounded by the substantially biodegradable substrate. When the financial transaction card is inserted into a planting composition, the substantially biodegradable substrate decomposes leaving the plurality of seeds planted in the planting composition. The account identifier is securely connected to the substrate and links the substantially biodegradable substrate to a financial account. The account identifier is machine readable by a point-of-sale terminal. Methods of encouraging purchase and facilitating use of a stored-value card, and other embodiments of stored-value or financial transaction cards and associated assemblies are also disclosed.

BRIEF DESCRIPTION OF THE DRAWINGS

Embodiments of the invention will be described with respect to the figures, in which like reference numerals denote like elements, and in which.

DETAILED DESCRIPTION

Figure 1:
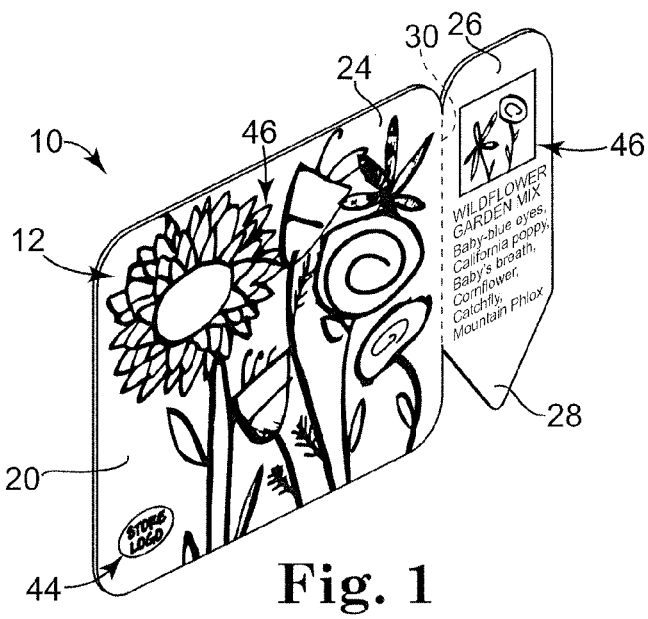
FIG. 1 is a perspective view illustration of a stored-value card, according to one embodiment of the present invention.

A stored-value card or other financial transaction product is adapted for making purchases of goods and/or services at, for example, a retail store or website. According to one embodiment, an original consumer buys a stored-value card to give a recipient who in turn is able to use the stored-value card at a retail store or setting to pay for goods and/or services. In one embodiment, the stored-value card provides for prepaid calling minutes, points, or other non-monetary measure of value such that the minutes or points in an account associated with stored-value card can be applied toward a telephone call, purchase, etc. A stored-value card, according to embodiments of the present invention, provides the consumer and recipient with an auxiliary use in addition to the ability to pay for goods and/or services or to accessing calling minutes, points, etc. with the stored-value card.

In particular, the stored-value card includes at least a first portion separable from the second portion. In one embodiment, the second portion is separable from the first portion and is configured for use as a stake or other marking member that can, for example, be placed in soil or other planting composition to mark where a flower or other plant was planted. The first portion includes an identifier or other device to function as the stored-value portion of the card. As such, even after separation of the first portion from the second portion, the first portion can be used as tender toward the purchase of one or more of goods and services. In one embodiment, this dual functional aspect (e.g., for use toward purchases and use as a stake) of the stored-value card promotes the sale, use, and/or loading of the stored-value card by potential consumers and/or bearers of the stored-value card.

To further enhance the dual functionality of the stored-value card, in one embodiment, the stored-value card is selectively attached to a backer or carrier for support wherein the backer is formed of a substantially biodegradable material and is embedded with seeds for one or more flower types or other suitable plant types. With this construction in mind, the stored-value card can be removed from the backer, the backer can be planted in a planting composition, and the second portion of the stored-value card positioned in the planting composition to mark where the backer was planted for future reference. In one embodiment, the stored-value card may also be formed of a biodegradable material and/or may also be embedded with seeds for planting.

Turning to the figures, FIGS. 1-7 illustrate various views of one embodiment of a stored-value card or product 10 formed of a substrate 12, which is any suitable material such as a somewhat rigid yet flexible material similar to that commonly used for identification cards, credit cards, etc. More specifically, in one embodiment, substrate 12 is formed of paper, cardstock, plastic, e.g. polycarbonate, polystyrene, or polyvinyl chloride (PVC), or other suitable material. In one embodiment, substrate 12 is formed of injected molded plastic or cut from sheet-stock plastic material. Substrate 12 can be formed in any other suitable planar or non-planar configuration as will be apparent to those of skill in the art upon reading this application. In one embodiment, substrate 12 is biodegradable, for example, is formed of a corn-based, rape seed-based or soybean-based plastic material, paper-based material, or other suitable biodegradable material, or is otherwise formed in an environmentally friendly manner to reduce fossil-fuel consumption, greenhouse gasses, and to be commercially compostable (e.g., polyethylene terephthalate glycol (PET-G), etc.).

Substrate 12 defines a first surface 20 and a second surface 22 opposite first surface 20. In one embodiment, at least one of first and second surfaces 20 and 22 is substantially planar. Substrate 12 defines a first section or portion 24 and a second section or portion 26. In one example, first portion 24 is formed with a substantially rectangular shape while second portion 26 is formed with a substantially rectangular shape except for a pointed end 28 configured to facilitate placement of second portion 26 into a planting composition as will be further described below.

In one embodiment, substrate 12 is perforated, scored, or otherwise weakened along a separation line 30 defined between first portion 24 and second portion 26 to provide for relatively easy separation of first portion 24 from second portion 26. In one example, first portion 24 and second portion 26 are separable from each other without the use of tools, such as by snapping, bending, and/or tearing first portion 24 from second portion 26. Although, primarily described as being formed of a single piece substrate 12, in one embodiment, first portion 24 is separately formed from and connected or otherwise attached to second portion 26. Further, in view of the above-described construction, in one embodiment, first portion 24 is considered an account access portion, and second portion 26 is considered a stake portion of stored-value card 10.

In one embodiment, stored-value card 10 as a whole is similarly sized to an identification card, a credit card, or other card sized to fit in a wallet of a card bearer (i.e. is wallet sized). In particular, in one embodiment, the overall dimensions of substrate 12 are about 8.5 cm by about 5.5 cm wide with a thickness of less than about 1 mm. In other embodiments, substrate 12 is otherwise shaped as a square, circle, oval, star, or any other suitable shape. In one embodiment, first portion 24 alone is similarly sized to an identification card, a credit card, or other card sized to fit in a wallet of a card bearer (i.e. is wallet sized).

First portion 24 and second portion 26 may be associated with or positioned relative to each other in any suitable manner. For example, as illustrated in FIGS. 1-7, first portion 24 and second portion 26 are positioned in a side-by-side manner such that each of first portion 24 and second portion 26 have a similar overall width W (FIG. 2). However, in one example, as illustrated with respect to stored-value card 10' in FIG. 8, first portion 24' and second portion 26' are positioned in a stacked manner such that each of first portion 24' and second portion 26' have a similar overall length L. Other configurations are also contemplated and will be apparent to those of skill in the art upon reading this application.

Figure 3:
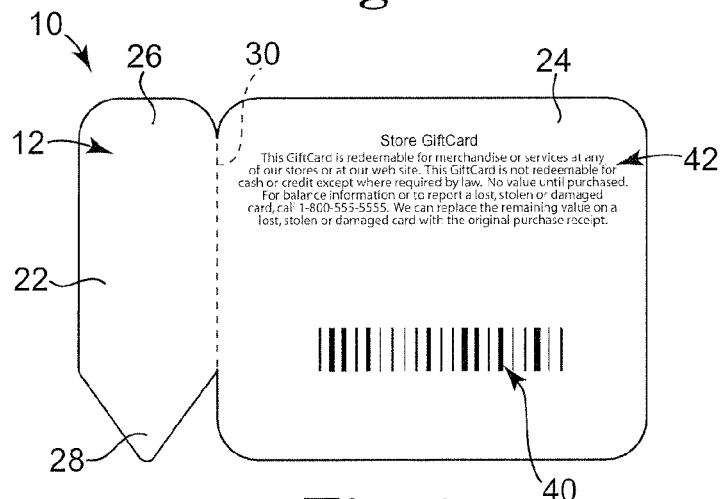
FIG. 3 is a rear view illustration of the stored-value card of FIG. 1.
Figure 4:
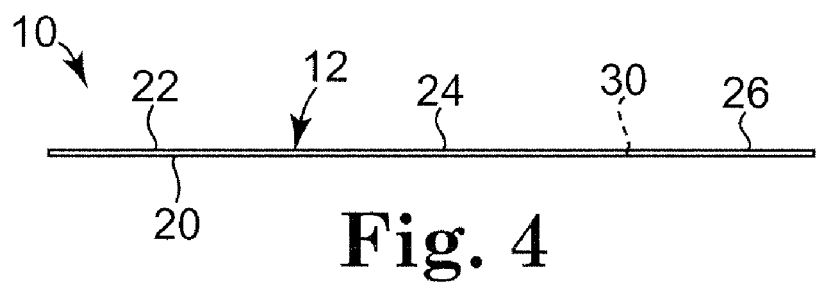
FIG. 4 is a top view illustration of the stored-value card of FIG. 1.
Figure 5:
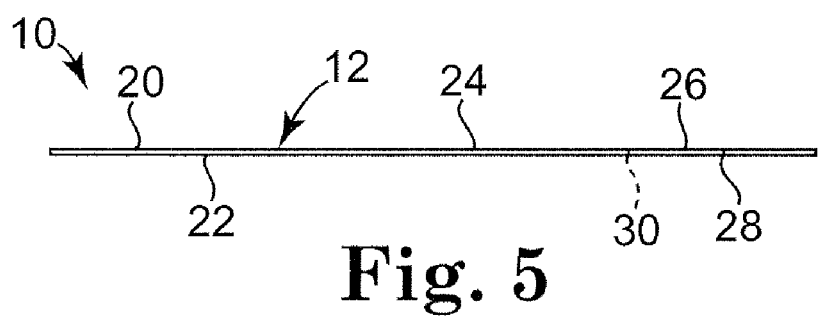
FIG. 5 is a bottom view illustration of the stored-value card of FIG. 1.
Figure 6:
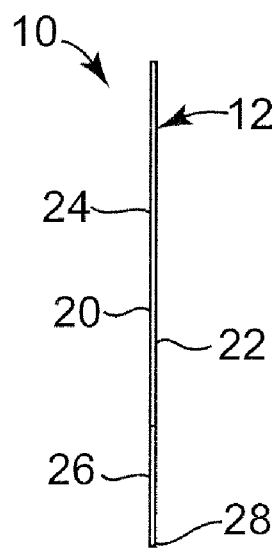
FIG. 6 is a right side view illustration of the stored-value card of FIG. 1.
Figure 7:
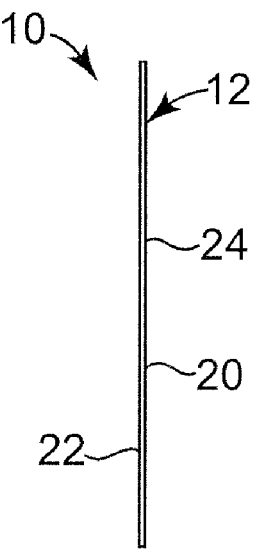
FIG. 7 is a left side view illustration of the stored-value card of FIG. 1.

Referring to the rear view illustration of FIG. 3, stored-value card 10, for example, second surface 22 of substrate 12, includes an account identifier 40, such as a bar code, a magnetic strip, a smart chip or other electronic device, a radio frequency identification (RFID) device, or other suitable identifier readily readable by a point-of-sale terminal, account access station, kiosk, or other suitable device. More particularly, in one embodiment, account identifier 40 is printed on or otherwise applied to second surface 22 of substrate 12 and is solely included on first portion 24. Account identifier 40 indicates a financial or other stored-value account or record to which stored-value card 10 is linked. The account or record of the monetary, point, minutes, or other balance on stored-value card 10 optionally is maintained on a database, other electronic or manual record-keeping system, or, in the case of "smart" cards for example, on a chip or other electronic device on/in stored-value card 10 itself. Accordingly, by scanning account identifier 40, the account or record linked to stored-value card 10 is identified and can subsequently be activated, have amounts debited therefrom, and/or have amounts credited thereto. First portion 24, or any other portion of stored-value card 10, that includes account identifier 40 is one example of means for linking stored-value card 10 with an account or record.

In one embodiment, redemption indicia 42 are included on stored-value card 10 such as on second surface 22 of substrate 12. Redemption indicia 42 indicate that stored-value card 10 is redeemable for the purchase of goods and/or services and that, upon use, a value of the purchased goods and/or services will be deducted from the account or record linked to stored-value card 10. In one embodiment, redemption indicia 42 include phrases such as "<NAME OF STORE> GiftCard" and "This GiftCard is redeemable for merchandise or services at any of our stores or at our website," and/or provides help or phone line information in the case of a lost, stolen, or damaged stored-value card, etc.

In one embodiment, stored-value card 10 includes other indicia 44 disposed on stored-value card 10 such as, for example, brand indicia which is one example of means for associating stored-value card 10 with at least one of a product, a brand, a store, a holiday, a season, an occasion, a media format, e.g. characters, logos, scenes, or other illustrations or photographs related to at least one of a movie, television show, book, video game, etc. In one example, substrate 12, more specifically, first surface 20 of substrate 12, includes graphical indicia 46 corresponding with the plantable nature of stored-value card 10 and/or backer 70 associated therewith. For example, graphical indicia 46 may include a depiction flowers, plants, etc. similar to those of an associated backer 70 as will be further described below. In one embodiment, graphical indicia 46 alternatively or additionally include a listing of the flowers or plants associated with backer 70 and/or stored-value card 10 on second portion 26, and therefore, in one example, serve as a seed identifier. One example of means for identifying at least one type of the one or more seeds 50 or 78 (e.g., FIGS. 8-11) is second portion 26 with graphical indicia 46.

Other indicia or additional features may also be included on stored-value card 10 as will be apparent to those of skill in the art upon reading this application. In one example, any one or more of indicia 42, 44, and 46 may not be included on stored-value card 10. In one embodiment, account identifier 40, indicia 42, indicia 44 and/or indicia 46 are printed to stored-value card 10 with soy-based or other ink configured to reduce fossil-fuel consumption and greenhouse gases, thereby, contributing to the environmentally friendly nature of stored-value card 10.

Figure 8:
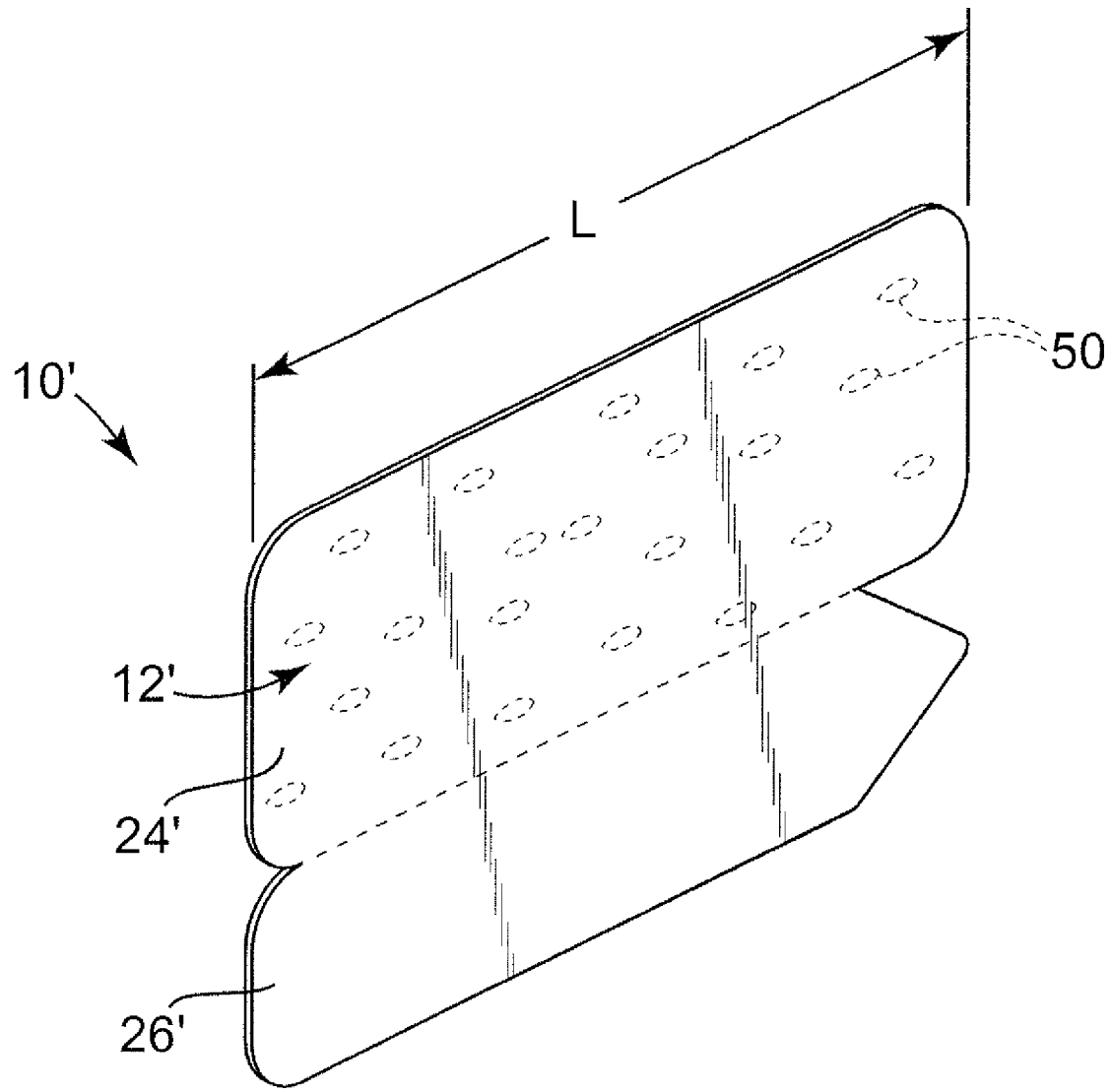
FIG. 8 is a perspective view illustration of a stored-value card, according to one embodiment of the present invention.
Figure 11:
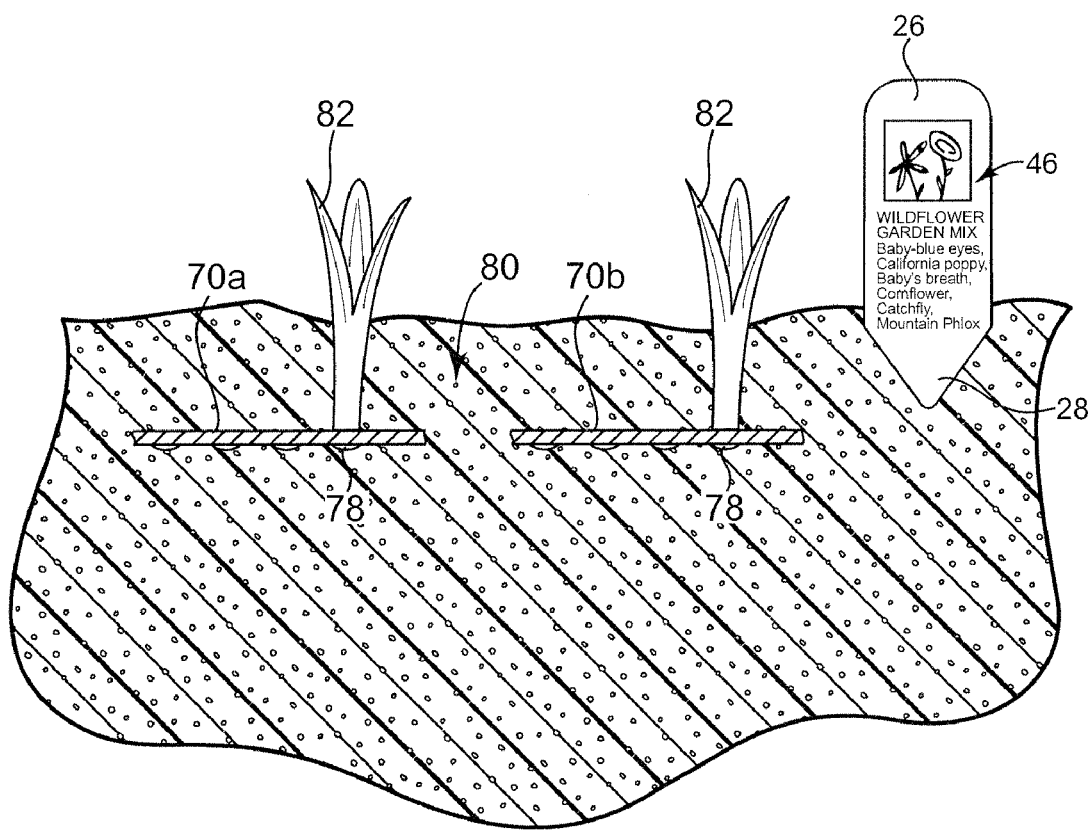
FIG. 11 is a front cross-sectional view illustration of a planting including the backer of FIGS. 9 and 10 and a portion of the stored-value card of FIG. 1, according to one embodiment of the present invention.

FIG. 8 illustrates another embodiment of a stored-value card as generally indicated at 10'. Stored-value card 10' is similar to stored-value card 10 of FIGS. 1-7 except where specifically described herein. In one example, stored-value card 10' is formed of a substrate 12', which is similar to substrate 12 described above, that is biodegradable and embedded with one or more seeds 50 (e.g., a plurality of seeds) in one or more of first and second portions 24' and 26'. In this manner, stored-value card 10' itself is configured to be planted in planting composition 80 (FIG. 11). It should be noted that while stored-value card 10' is illustrated with the plurality of seeds 50, in one embodiment, stored-value card 10 is similarly embedded with a plurality of seeds (not shown). Other characteristics of stored-value card 10 and stored-value card 10' can be supplemented and/or interchanged with each other as will be apparent to those of skill in the art upon reading this application.

Figure 9:
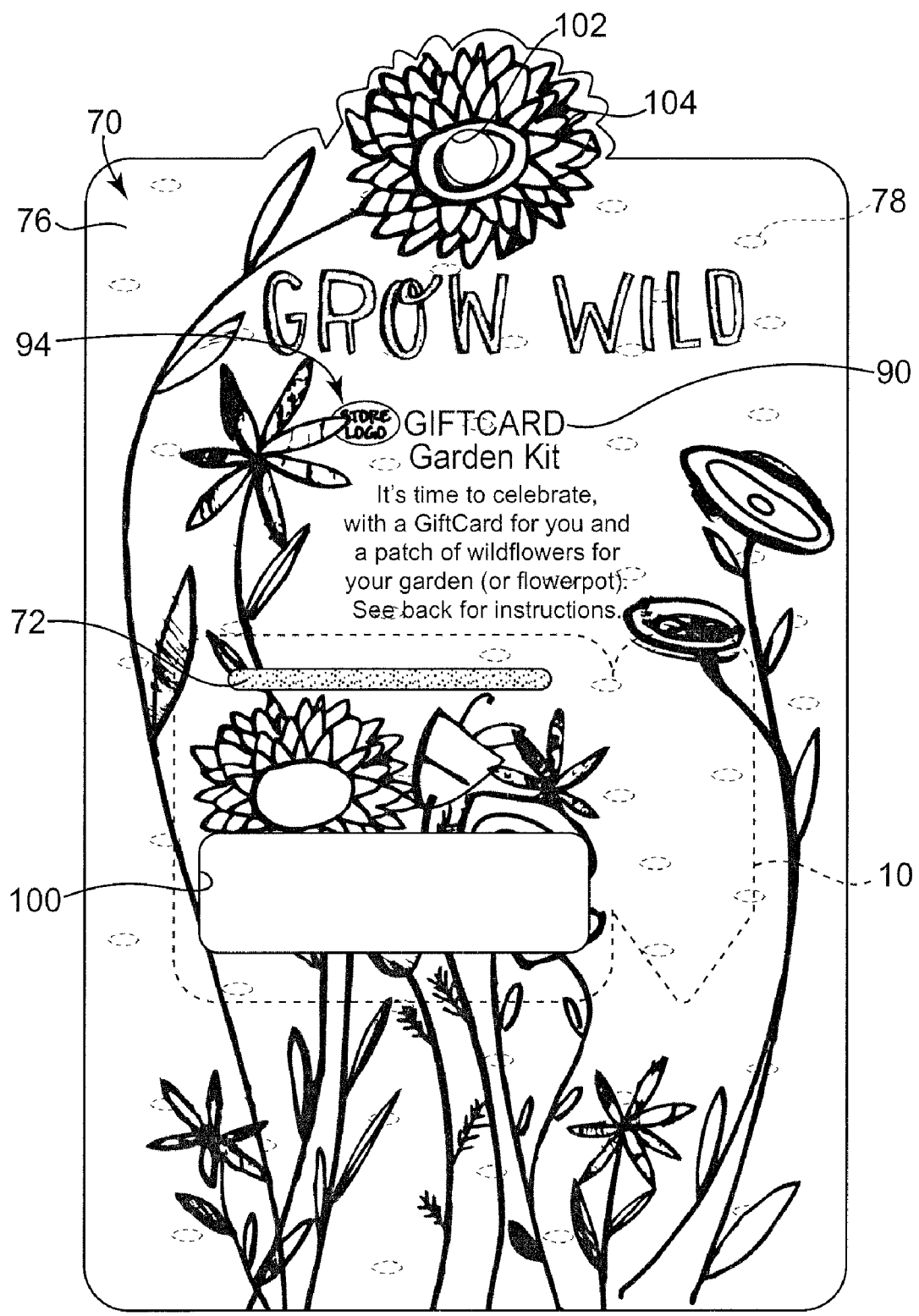
FIG. 9 is a front view illustration of a backer for a stored-value card, according to one embodiment of the present invention.
Figure 10:
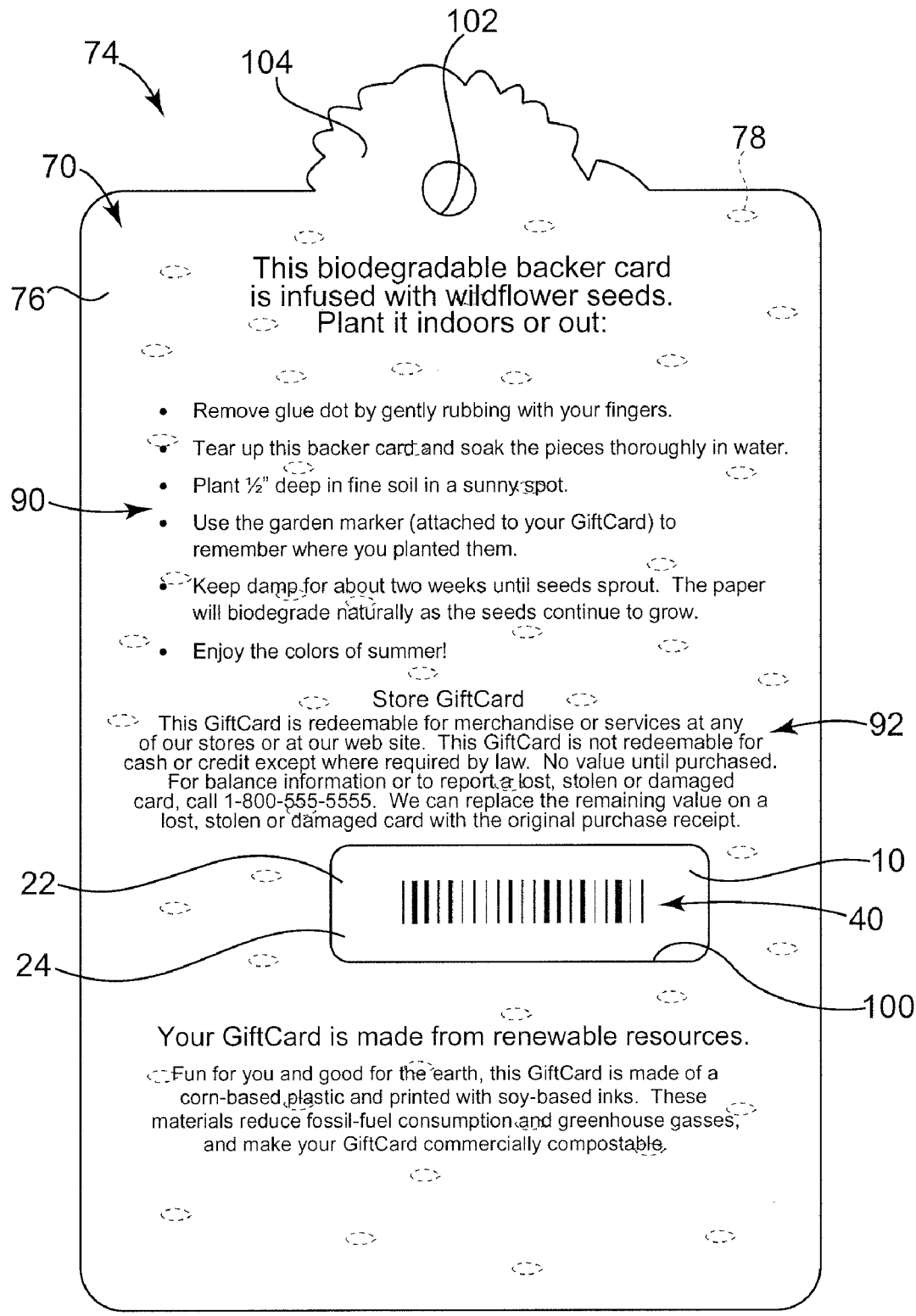
FIG. 10 is a rear view illustration of a stored-value card assembly including the backer of FIG. 9 and the stored-value card of FIG. 1, according to one embodiment of the present invention.

FIGS. 9 and 10 illustrate a carrier or backer 70 for supporting stored-value card 10. Stored-value card 10, which is represented in phantom lines in FIG. 9 for illustrative purposes so as to not obstruct backer 70, is readily releasably attached to backer 70, for example by a removable adhesive 72 or the like. Backer 70 and stored-value card 10 collectively define a stored-value card assembly or stored-value product assembly 74 (FIG. 10). Notably, while backer 70 is primarily described with respect to stored-value card 10, in one embodiment, backer 70 is similarly configured for use with stored-value card 10' to collectively form a similar stored-value card assembly as will be apparent to those of skill in the art upon reading this application.

In one embodiment, backer 70 comprises a single layer or multiple layers of paper or plastic material 76, for example, generally in the form of a relatively stiff but bendable/flexible card. In one embodiment, material 76 is substantially biodegradable (e.g., is a corn-based material such as a polylactic acid (PLA) matte corn material, rape seed-based material, soybean-based material, or other suitable material) and is formed with one or more seeds 78 (e.g., a plurality of seeds 78) embedded therein. In one example, material 76 is fibrous and is water soluble, which allows material 76 to securely contain the one or more seeds 78 between its fibers and to facilitate growth of the one or more seeds 78 by degrading or disintegrating after planting. More specifically, backer 70 is configured for planting within a planting composition 80, as generally illustrated with additional reference to FIG. 11, such that material 76 degrades within planting composition 80 releasing the one or more seeds 78 or otherwise allowing the one or more seeds 78 to sprout and grow as generally indicated as sprouts or plants 82. As a result, the one or more seeds 78 grow within planting composition 80 in a manner similar to seeds planted directly into planting composition 80 without material 76. The one or more seeds 78 may be of any suitable type such as vegetable seeds, flower seeds, etc. In one embodiment, all of the one or more seeds 78 are of a single type and are related to a single type of flower, vegetable, or other plant 82. In one example, the one or more seeds 78 provide seeds for growing a mix of wildflowers or other plants 82.

In one embodiment, backer 70 displays indicia, graphics or text information including store logo(s), store name(s), slogans, advertising, instructions, directions, brand indicia, promotional information, holiday indicia, seasonal indicia, media format identifiers, characters, to, from, amount, and message fields, and/or other information. In one example, indicia 90 promote that stored-value card assembly 74 serves as a garden kit including plantable backer 70 and second portion 26 of stored-value card 10, which functions a marking stake. In one example, indicia 90 additionally instruct the bearer of stored-value card assembly 74 on how to plant seeds 78 and mark their planting with second portion 26.

More specifically, in one embodiment, indicia 90 indicate that stored-value card 10 should be removed from backer 70 and adhesive 72 removed from each of the backer 70 and stored-value card 10 by rubbing adhesive 72 with one's fingers. In one example, indicia 90 further indicate that backer 70 be torn into pieces, soaked thoroughly in water, and planted (e.g., 0.5 inches deep) in planting composition 80. Indicia 90 may further indicate that second portion 26 of stored-value card 10 may be used to mark where backer 70 was planted, instruct the user to keep the planting composition 80 damp for about two weeks until seeds 78 sprout, and/or to enjoy the colors of the flowers, which will subsequently grow from seeds 78. Other instruction indicia 90 may additionally or alternatively be included on one or both of backer 70 and stored-value card 10.

Referring to FIG. 10, in one embodiment, indicia 92 indicate that stored-value card 10 or, more particularly, first portion 24 of stored-value card 10, is redeemable for the purchase of goods and/or services and that upon use, a value of the purchased goods and/or services will be deducted from the account or record linked to stored-value card 10. In one embodiment, indicia 92 include phrases such as "<NAME OF STORE> GiftCard" and "This GiftCard is redeemable for merchandise or services at any of our stores or at our website," and/or provides help or phone line information in case of a lost, stolen, or damaged stored-value card 10, etc.

Brand indicia 94 (FIG. 9) may also or alternatively be included to identify a store, brand, department, etc. and/or services associated with stored-value card 10. Any of indicia 42, 44, 46 (e.g., FIGS. 2 and 3), 90, 92, 94 (e.g., FIGS. 9 and 10), or other indicia optionally may appear anywhere on backer 70 or stored-value card 10. Additional information besides that specifically described and illustrated herein may also be included and/or one or more of indicia 42, 44, 46, 90, 92, 94 may be eliminated. In one example, indicia 90, 92, and 94, or other indicia on backer 70 are printed thereto with soy-based ink or other ink configured to reduce fossil-fuel consumption and greenhouse gases, thereby, contributing to the environmentally friendly nature of stored-value card assembly 74.

In one embodiment, backer 70 includes a window or opening 100 for displaying account identifier 40 of stored-value card 10 therethrough as illustrated in FIG. 10. As previously described, account identifier 40 is adapted for accessing a financial or other stored-value account or a record associated with stored-value card 10 for activating, loading, or debiting from the account or record. Accordingly, opening 100 allows viewing or other access to account identifier 40 to activate and/or load stored-value card 10, more particularly, first portion 24 of stored-value card 10, without removing stored-value card 10 from backer 70. In one embodiment, a portion of backer 70 alternatively is configured to be folded away from the remainder of backer 70 to access account identifier 40 without removing stored-value card 10 from backer 70.

In one embodiment, backer 70 includes a hanging aperture 102 or similar feature configured to receive a hook or other display member to hang backer 70 therefrom. In one example, hanging aperture 102 is substantially transversely centered on backer 70 and is positioned near a top end 104 thereof. Although as primarily described herein backer 70 is a planar substrate, in one embodiment, backer 70 may include fold lines or otherwise be configured to substantially wrap or enclose stored-value card 10 as will be apparent to those of skill in the art upon reading the present application. Backer 70 is one example of means for supporting stored-value card 10 for display in a retail setting.

Figure 12:
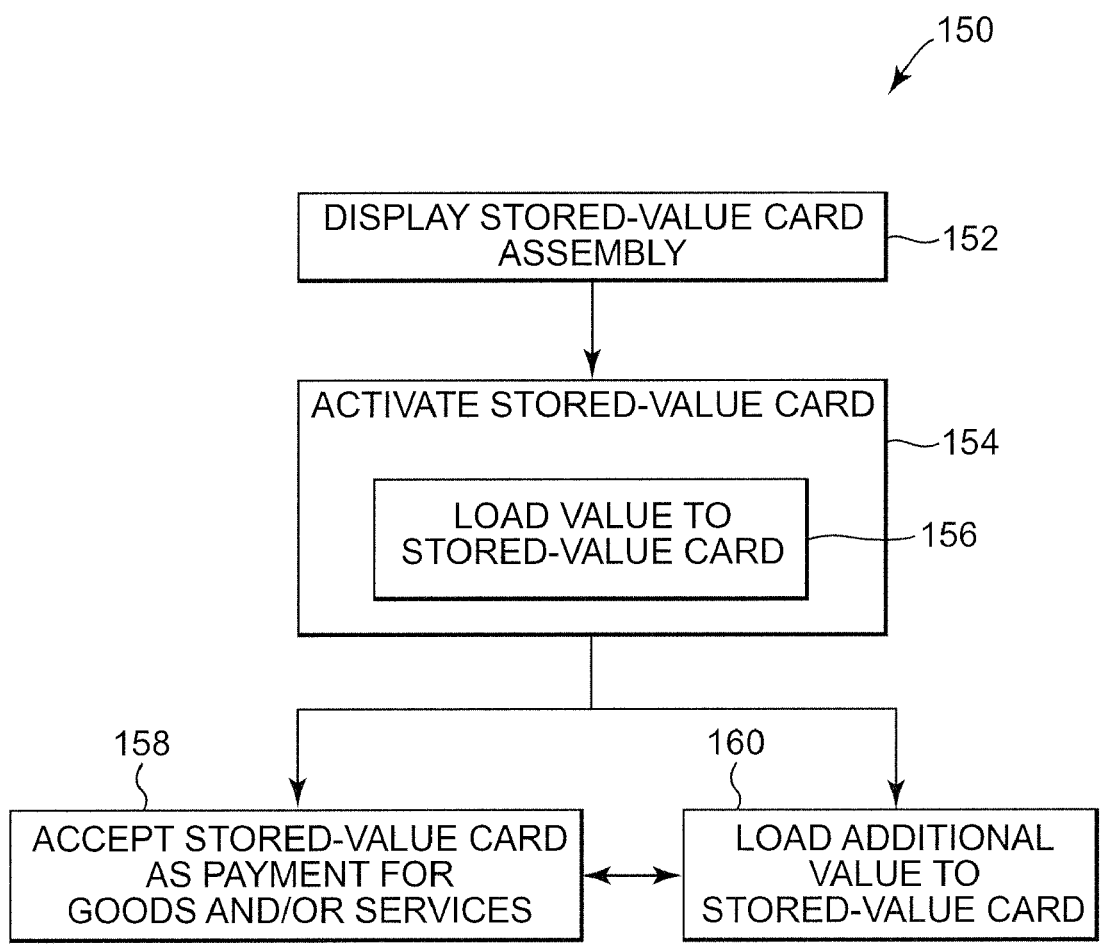
FIG. 12 is a flow chart illustrating a method of encouraging purchase and facilitating use of a stored-value card assembly, according to one embodiment the present invention.

FIG. 12 is a flow chart illustrating one embodiment of a method 150 of encouraging purchase and facilitating use of stored-value card assembly 74 by consumers and/or recipients. At 152, stored-value card assembly 74 is placed or hung from a rack, shelf, or other similar device to display stored-value card 10 for sale to potential consumers. For example, hanging aperture 102 may be placed around a corresponding arm of a display system in a retail setting to hang backer 70 therefrom. In one embodiment, a depiction of stored-value card 10 is placed on a website for viewing and purchase by potential consumers.

At 154, a consumer who has decided to purchase stored-value card 10 presents the stored-value card 10 on backer 70 to a retail store employee, retail store kiosk, remote terminal, or other person or device to scan account identifier 40 to access an account or record linked to account identifier 40. In particular, account identifier 40 is scanned or otherwise accessed, for example through window 100 of backer 70 to activate stored-value card 10. Upon accessing the account or record, then, at 156, value is added to the account or record in the form of monetary value, points, minutes, etc. Thus, stored-value card 10 is activated and loaded.

Once stored-value card 10 is activated and loaded, stored-value card 10 can be used by the consumer or any other bearer of stored-value card 10 to purchase goods and/or services at the affiliated retail setting (e.g., a retail store or website) or can be used in exchange for calling minutes, etc. In one embodiment, where stored-value card 10 is displayed on a website at 152, then, at 154, stored-value card 10 may be activated in any suitable method and may not require the physical scanning of account identifier 40 to be activated or to otherwise access the associated account or record such as at 156.

In one example, at 158, the retail store or other affiliated retail setting or website accepts stored-value card 10 as payment towards the purchase of goods and/or services made by the current bearer of stored-value card 10. In particular, the value currently loaded on stored-value card 10 (i.e. stored or recorded in the account or record linked to account identifier 40) is applied toward the purchase of goods and/or services. At 160, additional value is optionally loaded on stored-value card 10 at a point of sale terminal, kiosk, or other area of the retail store or related setting. Upon accepting stored-value card 10 as payment at 158, the retail store or related setting can subsequently perform either operation 158 or operation 160 as requested by a current bearer of stored-value card 10. Similarly, upon loading additional value on stored-value card 10 at 160, the retail store or related setting can subsequently perform either operation 160 again or operation 158. In one example, the ability to accept stored-value card 10 as payments for goods and/or services is limited by whether the account or record associated with stored-value card 10 has any value stored or recorded therein at the time of attempted redemption.

Figure 2:
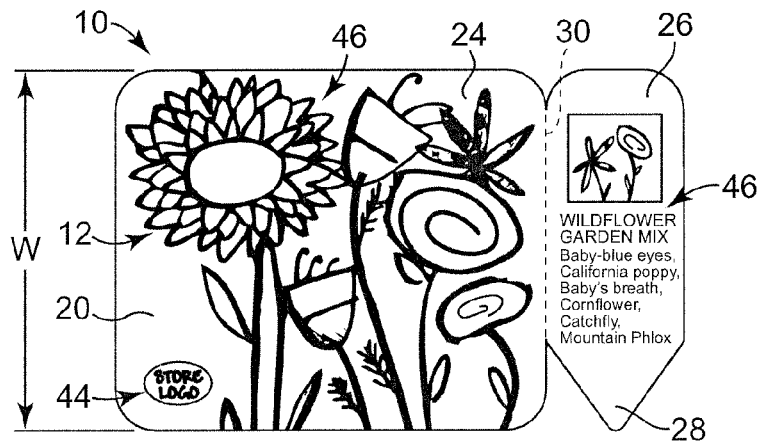
FIG. 2 is a front view illustration of the stored-value card of FIG. 1.
Figure 13:
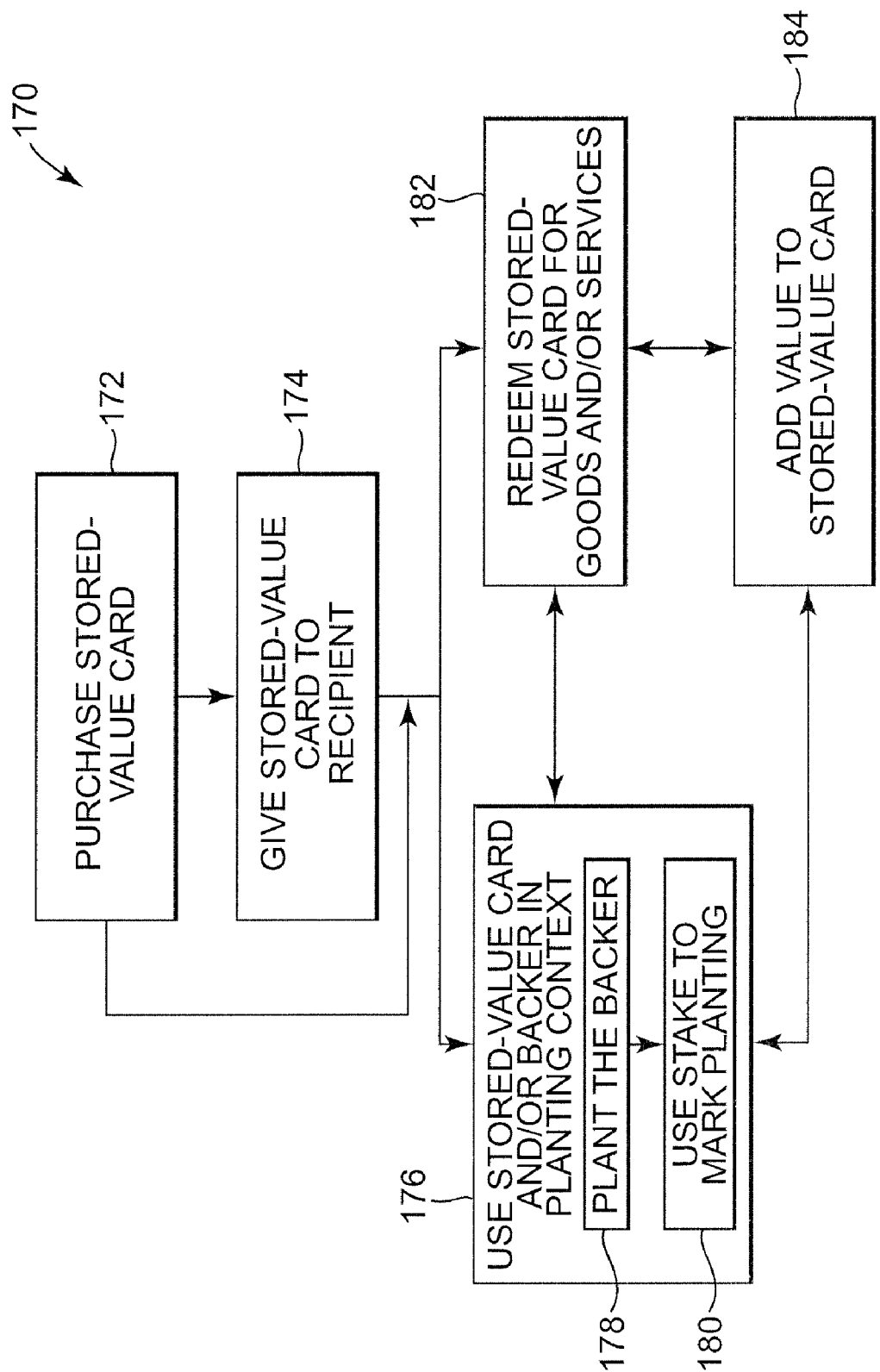
FIG. 13 is a flow chart illustrating a method of using a stored-value card assembly, according to one embodiment of the present invention.

FIG. 13 is a flow chart illustrating one embodiment of a method 170 of using stored-value card 10 (e.g., FIG. 1). At 172, a potential consumer of stored-value card 10, which is displayed in a retail store or viewed on a website, decides to and does purchase stored-value card 10 from the retail store or website. Stored-value card 10 can be displayed and purchased alone or as part of stored-value card assembly 74 (FIG. 10) along with backer 70. Upon purchasing a stored-value card 10, a retail store employee, a retail store kiosk, or other person or device scans account identifier 40 (FIGS. 3 and 10) through window 100 of backer 70 or otherwise reads or accesses account identifier 40. Upon accessing account identifier 40, the account or record linked to account identifier 40 is accessed and activated to load value onto stored-value card 10. In one embodiment, such as where stored-value card 10 is purchased at 172 via a website, actual scanning of account identifier 40 may be eliminated.

At 174, the consumer optionally gives stored-value card 10 to a recipient, such as a graduate, relative, friend, expectant parents, one having a recent or impending birthday, a couple having a recent or impending anniversary, etc. In one embodiment, a plurality of stored-value cards 10 are purchased and given to party goers, such as at a birthday party, etc. as party favors or gifts. As an alternative, the consumer can keep stored-value card 10 for his or her own use thereby eliminating operation 174.

At 176, the consumer or recipient, whoever is in current ownership or otherwise is the current bearer of stored-value card 10, removes stored-value card 10 from backer 70 and plants at least a portion of stored-value card assembly 74. For example, at 178, the current bearer of stored-value card 10 plants backer 70 as instructed by indicia 90. More specifically, the current bearer of stored-value card assembly 74 tears backer 70 into pieces such as pieces 70a and 70b as illustrated in FIG. 11, soaks backer 70, and plants backer pieces 70a and 70b within planting composition 80 as illustrated with additional reference to FIG. 11.

In one example, at 180, second portion 26 of stored-value card 10 is removed from first portion 24 and is placed within planting composition 80 as illustrated in FIG. 11 to mark where backer 70 (or at least a piece 70a or 70b thereof) was planted. Subsequently, the consumer or recipient can water and/or otherwise wait for the plurality of seeds 78 of backer 70 to sprout and grow as plants 82. In one embodiment, for example, where stored-value card 10' is substituted for stored-value card 10 as illustrated with additional reference to FIG. 8, first portion 24' of stored-value card 10' is additionally or alternatively planted in planting composition 80 to allow the plurality of seeds 50 to spout and grow similar to the one or more seeds 78.

At 182, the consumer or recipient redeems stored-value card 10, more particularly, first portion 24 of stored-value card 10 for goods and/or services from the retail store or website. At 184, the consumer or recipient of stored-value card 10 optionally adds value to first portion 24 of stored-value card 10, and more particularly, to the account or record associated with account identifier 40 included therewith, at the retail store or over the Internet (i.e. via the website). Upon using backer 70 and/or stored-value card 10 in the planting context at 176, redeeming stored-value card 10 at 182, or adding value to stored-value card 10 at 184, the consumer or recipient of stored-value card 10 subsequently can perform any of operations 176, 182, or 184 as desired. In one embodiment, the ability of the consumer or recipient to repeat redeeming stored-value card 10 at 182 is limited by whether the account or record linked with stored-value card 10 has any remaining value stored or recorded therein at the time of attempted redemption.

Although described above as occurring at a single retail store or website, in one embodiment, purchasing stored-value card 10 at 172, redeeming stored-value card 10 at 182, and adding value to stored-value card 10 at 184, can each be performed at any one of a number of stores adapted to accept stored-value card 10 or over the Internet. In one example, a number of stores are each part of a chain or are similarly branded stores. In one example, a number of stores include at least one website and/or at least one conventional brick and mortar store.

Stored-value cards come in many forms, according to embodiments of the invention. The gift card, like other stored-value cards, can be "re-charged" or "re-loaded" at the direction of the original consumer, the gift recipient, or third party. The term "loading on" or "loaded on" herein should be interpreted to include adding to the balance of an account or record associated with a stored-value card. The balance associated with the stored-value card declines as the card is used, encouraging repeat visits or use. The card remains in the user's purse or wallet, serving as an advertisement or a reminder to revisit the associated merchant. Gift cards according to embodiments of the invention provide a number of advantages to both the consumer and the merchant. Other gift cards and stored-value cards according to embodiments of the invention include loyalty cards, merchandise return cards, electronic gift certificates, calling cards, employee cards, frequency cards, prepaid cards, and other types of cards associated with or representing purchasing power or monetary value, for example.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A financial transaction card comprising:
   a substantially biodegradable substrate;
   a plurality of seeds coupled with the substantially biodegradable substrate such that the plurality of seeds are each embedded within and substantially surrounded by the substantially biodegradable substrate such that the substantially biodegradable substrate separates individual ones of the plurality of seeds embedded within the substantially biodegradable substrate from each other, wherein when the financial transaction card is inserted into a planting composition, the substantially biodegradable substrate decomposes leaving the plurality of seeds planted in the planting composition; and
   an account identifier securely connected to the substantially biodegradable substrate and linking the substantially biodegradable substrate to a financial account, wherein the account identifier is machine readable by a point-of-sale terminal.

2. The financial transaction card of claim 1, wherein the account identifier includes a bar code.

3. The financial transaction card of claim 1, wherein the account identifier includes one or more of a bar code, a magnetic strip, a smart chip, and a radio frequency identification (RFID) device.

4. The financial transaction card of claim 1, wherein each individual seed of the plurality of seeds is embedded within and substantially separately surrounded by the substantially biodegradable substrate.

5. The financial transaction card of claim 1, wherein prior to insertion of the financial transaction card into the planting composition, the substantially biodegradable substrate maintains individual seeds of the plurality of seeds in stationary positions substantially spaced from one another.

6. The financial transaction card of claim 1, wherein the substantially biodegradable substrate defines a first portion and a second portion attached to and readily separable from the first portion without the use of tools, the first portion including the account identifier.

7. The financial transaction card of claim 6, wherein the second portion includes indicia identifying a type of the plurality of seeds.

8. The financial transaction card of claim 7, wherein the type of the plurality of seeds is one of flowers and vegetables.

9. The financial transaction card of claim 6, wherein the first portion is configured to be bent relative to and snapped from the second portion to separate the first portion from the second portion.

10. The financial transaction card of claim 1, wherein the substantially biodegradable substrate is a single piece of material.

11. The financial transaction card of claim 10, wherein the substantially biodegradable substrate is plastic.

12. The financial transaction card of claim 1, wherein the substantially biodegradable substrate is substantially wallet-sized.

13. A combination including:
    a financial transaction card comprising:
       a substantially biodegradable substrate,
       a plurality of seeds coupled with the substantially biodegradable substrate such that the plurality of seeds are each embedded within and substantially surrounded by the substantially biodegradable substrate such that the substantially biodegradable substrate separates individual ones of the plurality of seeds embedded within the substantially biodegradable substrate from each other, wherein when the financial transaction card is inserted into a planting composition, the substantially biodegradable substrate decomposes leaving the plurality of seeds planted in the planting composition, and
       an account identifier securely connected to the substantially biodegradable substrate and linking the substantially biodegradable substrate to a financial account, wherein the account identifier is machine readable by a point-of-sale terminal; and
    a backer selectively coupled with and configured to support the substrate.

14. The combination of claim 13, wherein the backer is formed of a substantially biodegradable material.

15. The combination of claim 14, wherein the plurality of seeds is a first plurality of seeds, and the backer includes a second plurality of seeds embedded therein such that when the backer is planted in the planting composition, the second plurality of seeds are planted in a suitable manner to permit the second plurality of seeds to grow.

16. A stored-value card assembly comprising:
    one or more seeds; and
    means for substantially surrounding the one or more seeds with a single piece of readily biodegradable material such that the one or more seeds are embedded within the means for substantially surrounding such that the one or more seeds are substantially immovable relative to the means for substantially surrounding, wherein the means for substantially surrounding separates individual ones of the one or more seeds embedded within the means for substantially surrounding from each other; and
    means for linking the means for substantially surrounding the one or more seeds to a stored-value account or record such that a value associated with the stored-value account or record can be accessed and applied toward a purchase of one or more of goods and services, wherein the means for linking is directly and securely connected to the means for substantially surrounding the one or more seeds.

17. The stored-value card assembly of claim 16, further comprising means for identifying at least one type of the one or more seeds, the means for identifying being statically applied to the means for substantially surrounding the one or more seeds.

18. The stored-value card assembly of claim 16, further comprising:
   means for readily dividing the means for substantially surrounding the one or more seeds into at least two portions without the use of tools, wherein the at least two portions include a first portion including the means for linking.

19. The stored-value card assembly of claim 18, wherein the at least two portions include a second portion including the means for identifying the at least one type of the one or more seeds.

20. A method of encouraging purchase and facilitating use of a stored-value card, the method comprising:
   forming a substantially biodegradable member around one or more seeds to form a stored-value card, wherein forming the substantially biodegradable member around the one or more seeds is performed such that each of the one or more seeds is substantially surrounded by and individually embedded within the substantially biodegradable member and the seeds form at least part of the substantially biodegradable member, and the stored-value card includes an account identifier linking the stored-value card to a stored-value account or record;
   displaying the stored-value card for retail sale; and
   activating the stored-value card to permit deductions from the stored-value account or record.

21. The method of claim 20, further comprising receiving the stored-value card as payment for goods or services including deducting at least a portion of a value of the goods or services from the stored-value account or record.

22. The financial transaction card of claim 1, wherein each of the plurality of seeds is substantially immovable relative to the substantially biodegradable substrate.

23. The method of claim 20, wherein displaying the stored-value card includes providing the stored-value card such that each of the one or more seeds is substantially immovable relative to a remainder of the substantially biodegradable member.

\* \* \* \* \*